Patented May 8, 1951

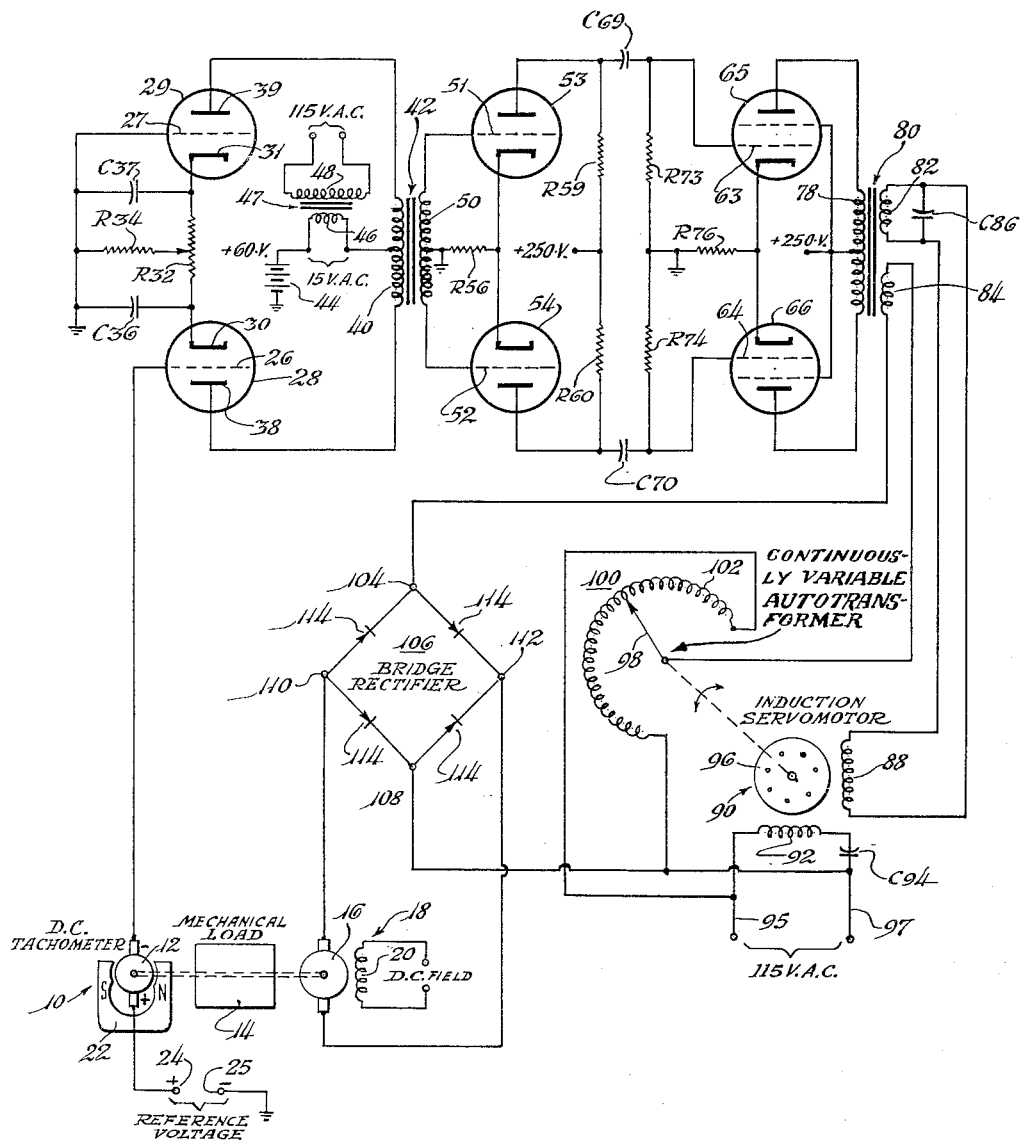

2,551,620

UNITED STATES PATENT OFFICE 2,551,620

SPEED CONTROL APPARATUS

Herbert E. Meinema, Chicago, Ill.

Application May 2, 1949, Serial No. 90,915

10 Claims. (Cl. 318—317)

My invention relates generally to speed control apparatus, and more particularly to apparatus whereby the speed of an electric motor may be very accurately controlled in response to a voltage change.

In various types of equipment, apparatus, and machinery, it is desirable accurately to regulate the speed of rotation of a motor and to have means whereby its speed may be changed at will, or in response to a variable controlling factor. For example, in machine tools such as profiling machines, drilling machines, lathes, paper making machinery, strip mills, and the like, it is desirable to control very accurately the speed at which the tools are fed relative to the work.

A further use is in the control of the speed of a strip film camera of the type shown in the patent to Hancock and Meinema, No. 2,413,349, in place of the mechanical variable speed transmission shown in the patent.

It is an object of my invention to provide an improved motor speed control apparatus which is capable of maintaining the motor speed constant at any desired speed under changing load, and is capable of varying the speed throughout a wide range.

A further object is to provide an improved motor speed control apparatus which is responsive to a variable voltage, and will accurately change the motor speed in response to a change in voltage.

A further object is to provide a speed control apparatus which, upon a change in the control voltage, will substantially instantaneously change the motor speed correspondingly.

A further object is to provide an improved speed control apparatus which does not hunt under normal operating conditions, but varies the motor speed smoothly upon variations in the control voltage.

Other objects will appear from the following description, reference being had to the accompanying drawing which consists of a circuit and block diagram of the complete speed control apparatus.

The apparatus comprises a direct current tachometer 10, the armature or rotor 12 of which is mechanically connected to a mechanical load 14, and also to the armature 16 of a direct current motor 18 having a separately direct current excited field winding 20.

The tachometer 10 may be of any suitable type, being illustrated as having a permanent field magnet 22. The controlling or reference voltage for determining the speed of operation of the motor 18 is impressed across terminals 24 and 25, one of which is connected to ground and the other of which is connected to one of the brushes of the tachometer, the other brush being connected to the control grid 26 of a triode 28. The positive side of the reference voltage is connected to the terminal 25 provided the tachometer is polarized as indicated.

The cathode 30 of triode 28 is connected to ground through a portion of an adjustable self-bias resistor R32 and a resistor R34 in series, and is also connected to ground through a bypass capacitor C36.

A triode 29, similar to the triode 28, has its control grid 27 connected to ground and has its cathode 31 biased through the other portion of adjustable resistor R32 and the resistor R34, the latter being bypassed by a capacitor C37.

The plates 38 and 39 of the triodes 28 and 29 are respectively connected to the opposite ends of the primary winding 40 of a transformer 42. The center tap of the primary winding 40 is connected to a suitable source of plate current shown as a battery 44 through a low impedance secondary winding 46 of a transformer 47, the primary 48 of which is connected to a suitable alternating current source such as 115 volt A. C. line. The turns ratio of the windings 46 and 48 is such that an alternating voltage of approximately 15 volts is superimposed upon the direct voltage supplied by the battery 44 or other D. C. source, which may, for example, supply 60 volts. It will be understood that it is not essential to supply direct current to the plates, but that by using a transformer supplying a sufficiently high A. C. voltage, and adding shunt capacitance to one or both of the windings of transformer 42, substantially equivalent results may be obtained, provided that the frequency of the A. C. source is constant.

The portion of the electronic circuit thus far described is essentially a modulator circuit, wherein the output A. C. voltage is a function of the unbalance existing in the plate current flow through the two triodes, due to differences in the potentials impressed upon the grids of the triodes. Other types of modulators, such as those employing diodes or saturable core reactors, could be utilized.

The secondary winding 50 of transformer 42 has its end terminals respectively connected to the grids 51 and 52 of push-pull amplifying triodes 53 and 54, the cathodes of these triodes being connected together and connected to the grounded center tap of the secondary winding 50 through a biasing resistor R56. Plate voltage is supplied to the triodes 53 and 54 from a suitable source indicated as a +250 v. terminal through load resistors R59 and R60 respectively.

The plates of the triodes 53 and 54 are coupled to the control grids 63 and 64 of tetrodes 65 and 66 respectively through blocking capacitors C69 and C70 respectively. The grids 63 and 64 are connected to ground through grid resistors R73 and R74 respectively, while their cathodes are connected together and to ground through a common self-bias resistor R76. The screen grids of the tetrodes 65 and 66 are connected to a suitable source of operating potential indicated as a +250 v. terminal, while their plates are connected to the ends of the primary winding 78 of a transformer 80.

The center tap of this primary winding is connected to the +250 v. terminal. The transformer 80 has a secondary winding 82, and a tertiary winding 84, the winding 82 having a phase correction capacitor C86 connected across its terminals. The winding 82 is connected to a field winding 88 of an induction motor 90, the other winding 92 of which is connected to the 115 volt alternating current lines 95 and 97 through a series capacitor C94. The primary winding 48 of transformer 47 is, of course, connected to the same A. C. supply lines 95 and 97. It will be understood that the capacitor C94 is for the purpose of shifting the phase in winding 92, and that if two-phase A. C. is available, this capacitor could be omitted, provided that the primary winding 48 be connected across one phase and the winding 92 be connected across the other phase.

The rotor 96 of the motor 90 is mechanically connected to the sliding contact member 98 of a continuously variable autotransformer 100. The contactor 98 is connected to one terminal of the tertiary winding 84, while the end terminals of the winding 102 of the continuously variable autotransformer are connected respectively to the lines 95 and 97.

The other terminal of the tertiary winding 84 is connected to an input terminal 104 of a bridge type rectifier 106. The other input terminal 108, opposite the terminal 104, is connected to line conductor 97. The output terminals 110 and 112 of the bridge rectifier are connected to the armature brushes of motor 18. The rectifying elements 114 of the bridge rectifier 106 may be of any suitable type depending partly upon the size of the motor 18, but are preferably of the selenium or copper oxide type.

Assuming that the apparatus is connected to suitable operating voltage sources, as indicated and described, and that a controlling voltage is impressed across the terminals 24, it will operate in the following manner.

The motor 18 will drive the load 14 and the tachometer 10, the latter generating a voltage opposing that impressed across the terminals 24, 25. Upon starting, the voltage generated by the tachometer will be less than that of the voltage impressed across the terminals 24, 25, and the grid 26 will therefore be more positive than the grid 27, and more current will therefore be conducted through triode 28 than through triode 29. Thus the current through the lower half of the primary winding 40 will be greater than that flowing through the upper half thereof.

It will be understood that the triodes 28 and 29 are initially adjusted to make their plate current flow equal by adjusting the relative amounts of self-bias on these tubes by means of adjustable resistor R32.

With the condition of unbalance as above assumed upon starting of the motor 18, the unbalance will cause the alternating component to be transmitted through the transformer 42 and impressed upon the input circuits of the amplifying triodes 53 and 54. The amplified output of the triodes 53 and 54 is impressed upon the control grids of the power amplifying tubes 65 and 66, and the output of the latter is impressed across the winding 88 of the induction motor 90, causing the latter to rotate clockwise, and therefore moving the sliding contactor 98 clockwise to increase the voltage impressed across the terminals 104 and 108 of the bridge rectifier 106.

There is a certain short time lag in the operation of the continuously variable autotransformer 100 due to the mechanical drive connection and the inertia of the induction motor and parts driven thereby, and it is partly for this reason that the tertiary winding 84 is connected in series with the continuously variable autotransformer 100 and the bridge rectifier 106. The current induced in the winding 84 immediately increases the voltage across the input terminals 104 and 108 of the rectifier and is of such phase that there is an immediate increase in the direct current flow through the armature winding of the motor 18, causing the latter immediately to increase in speed. The tachometer 10 is therefore driven at increased speed, and it generates an increasing voltage opposing that of the reference voltage impressed across the terminals 24, 25, and thus the voltage on the grid 26 is decreased. Such decrease in voltage on the grid 26 is reflected in decreased current output of the transformer 80, causing the motor 90 to slow down and eventually to stop.

As the potential on the grid 26 decreases to lower than ground potential, the current flow through triode 28 will become less than that flowing through triode 29, and as a result, the upper portion of the primary winding 40 will carry more current than the lower portion thereof, and the input to the triodes 53 and 54 will be of phase opposite to that previously supplied, and the phase of the current induced in the secondary winding 82 and tertiary winding 84 will also be reversed. Thus the motor 90 will start rotating in a counterclockwise direction tending to decrease the voltage supplied by the continuously variable autotransformer 100. Also, instantaneously upon the reversal of the phase in the output transformer 80, the tertiary winding 84 will have a voltage induced therein which is of phase opposed to that supplied by the continuously variable autotransformer, and this induced voltage will therefore immediately decrease the voltage impressed across the terminals 104 and 108 of the rectifier 106, and hence cause an immediate decrease in the armature current of motor 18, with a resultant reduction in speed. This reduced speed will result in a reduction in the voltage generated by the tachometer 10 so as again to increase the potential on the control grid 26 to ground potential.

From the foregoing, it will be clear that the speed of the motor 18 will be accurately regulated to operate at a speed determined by the control voltage impressed across the terminals 24 and 25. If the control voltage is constant, the speed of the motor will remain constant even though the load applied by the mechanical load device 14 varies considerably, because any tendency of the motor 18 to change its speed is immediately reflected in a change in the voltage generated by the tachometer 16, and as above described, this immediately results in a change in the current supplied to the armature winding of the motor 18. The corrective changes in the speed of the motor with changes in the countertorque applied by the load, are very rapid, since any lag in the operation of the induction motor 90 in changing the current supply to the armature of motor 18 is remedied by the immediate response effected through the use of the tertiary winding 84 in series with the continuously variable autotransformer 109. Since the response of the latter is instantaneous, a substantially instantaneous corrective change in voltage on the motor 18 is effected, and this is promptly followed by a corrective positioning of the sliding contactor 98 of the continuously variable autotransformer until the system is again in balance.

Noticeable hunting of the system is prevented since any lag or overtravel of the continuously variable autotransformer is immediately corrected by the current induced in the tertiary winding 84, which is of such phase as either to add to, or to subtract from, the current supplied by the continuously variable autotransformer.

It will be understood that the controlling voltage impressed upon the terminals 24, 25, may change very rapidly, and that the speed of the motor 18 will change correspondingly almost instantly, assuming that the size of the motor is properly related to the inertia and countertorque of the load driven thereby.

It will be understood that the major portion of the current for the operation of the direct current motor 18 is supplied by the continuously variable autotransformer 109. In actual practice I have found that it is desirable that the continuously variable autotransformer supply in the order of 90% of the current while the tertiary winding 84, when substantial change in speed is to be accomplished, supplies the remaining ten per cent. The relative percentages of the power supplied by the continuously variable autotransformer 109 and the tertiary winding 84 may be varied considerably depending upon the particular operating conditions for which the apparatus is designed.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a motor speed control apparatus for connection to an alternating current source and responsive to changes in a control voltage, or load, or both, the combination of a direct current motor having a winding in which the current flow determines the mechanical power output of the motor, a tachometer driven by the motor and having a direct current output which is a function of speed, electronic means for comparing the voltage produced by the tachometer with the control voltage and supplying alternating current power of one phase relative to that of the source when the control voltage is greater than the voltage generated by the tachometer and supplying alternating current power of opposite phase when the control voltage is less than the voltage generated by the tachometer, the alternating current power output increasing with an increase in the difference between the control voltage and the voltage generated by the tachometer, a variable voltage alternating current supply device connected to said source, an induction motor connected to operate said device and having a first winding connected to said alternating current source and a second winding coupled to the output of the electronic means, a coil inductively coupled to the output of the electronic system, a rectifier, and means connecting said device, the inductively coupled coil, the rectifier, and a winding of the direct current motor in series.

2. In a motor speed control apparatus for connection to an alternating current source and responsive to changes in a control voltage, or load, or both, the combination of a direct current motor having a winding in which the current flow determines the power output of the motor, a mechanical-electrical component coupled to the motor and providing an output potential which is a function of the speed at which it is driven, electronic means for comparing the voltage produced by said component with the control voltage and supplying alternating current power of one phase relative to that of the source when the control voltage is greater than the voltage provided by said component and supplying alternating current power of opposite phase when the control voltage is less than the voltage provided by said component, the alternating current power output increasing with an increase in the difference between the control voltage and the voltage provided by said component, a variable voltage alternating current supply device connected to said source, an induction motor connected to operate said device and having a first winding connected to said alternating current source and a second winding coupled to the output of the electronic system, a coil coupled to the output of the electronic system, a rectifier, and means connecting said device, the coil, the rectifier, and a winding of the direct current motor in series.

3. The combination set forth in claim 2, in which the electronic means comprises a pair of electron discharge devices each having a control grid, cathode, and plate; means connecting one of the grids directly to a point of constant potential and means for impressing the algebraic sum of the control voltage and the voltage provided by said mechanical-electrical component on the other grid; means including a center-tapped transformer winding to supply plate current to said electron discharge devices, said last named means including means for supplying an alternating component from the alternating current source; a secondary transformer winding coupled to the primary transformer winding; and means for amplifying the current induced in said secondary transformer winding.

4. In a motor speed control apparatus for connection to an alternating current source and responsive to changes in a control voltage, or load, or both, the combination of a direct current motor having a winding in which the current flow determines the torque of the motor, a tachometer having a direct current output, power supplying means responsive to the algebraic sum of the control voltage and the tachometer output voltage to supply alternating current power of one phase relative to that of the source when the algebraic sum of said voltages is positive and to supply alternating current of opposite phase when the algebraic sum of said voltages is negative, a variable voltage alternating current supply device connected to said source, an induction motor connected to operate said device and having a first winding connected to said alternating current source and a second winding coupled to the output of the power supplying means, power transmitting means coupled to the power supplying means, a rectifier, and means connecting said device, the power transmitting means, the rectifier, and a winding of the direct current motor in series.

5. In a motor speed control apparatus for connection to an alternating current source and responsive to changes in a control voltage, or load, or both, the combination of a direct current motor having a winding in which the current flow determines the torque of the motor, a tachometer having a direct current output, an electronic system for comparing the voltage produced by the tachometer with the control voltage and supplying alternating current power of one phase relative to that of the source when the control voltage is greater than the voltage generated by the tachometer and supplying alternating current power of opposite phase when the control voltage is less than the voltage generated by the tachometer, a variable voltage alternating current supply device connected to said source, an induction motor connected to operate said device and having a first winding connected to said alternating current source and a second winding coupled to the output of the electronic system, a coil inductively coupled to the output of the electronic system, a rectifier, and means connecting said device, the inductively coupled coil, the rectifier, and a winding of the direct current motor in series.

6. The combination set forth in claim 2, in which the alternating current supply device is a continuously variable autotransformer, and the rectifier is of the bridge type.

7. The combination set forth in claim 2, in which the alternating current power for operating the direct current motor is supplied mainly by the alternating current supply device and to a much lesser extent by the coil while the direct current motor is being accelerated.

8. The combination set forth in claim 2, in which the alternating current supply device supplies in the order of 90% of the power required for the operation of the direct current motor while the latter is being accelerated, and the remaining power is supplied by the coil.

9. The combination set forth in claim 2, in which the direct current motor, the load driven thereby, and the mechanical-electrical component are mechanically coupled so as to operate at the same speed or at speeds differing by constant factors.

10. In a speed control apparatus, the combination of a direct current motor having a fixed field and an armature winding for driving a load, a direct current tachometer driven by said direct current motor, a pair of electron discharge devices each having an anode, a cathode, and a control grid, a source of control voltage, means connecting said source in series with said tachometer between ground and the control grid of one of said devices, a connection between the control grid of the other device and ground, a source of anode current for said devices comprising an alternating component and a direct current component, an output transformer for said devices including a primary winding having a center tap connected to said source, a push-pull amplifier connected to the secondary of said transformer, an induction motor having a first winding connected to an alternating current source in phase with the alternating component of said source of anode voltage for said devices, said induction motor having a second winding coupled to the output of said push-pull amplifier, a continuously variable autotransformer connected to said alternating current source, a winding inductively coupled to the output of said push-pull amplifier, a rectifier, and means connecting the continuously variable autotransformer, the inductively coupled winding, the rectifier, and the direct current armature winding in series.

HERBERT E. MEINEMA.

No references cited.